United States Patent [19]

Morita et al.

[11] Patent Number: 5,432,211
[45] Date of Patent: Jul. 11, 1995

[54] LUBRICATING PAINT

[75] Inventors: Ryoji Morita; Osamu Furuyama; Shigeo Tanaka, all of Tokyo, Japan

[73] Assignee: Nihon Parkerizing Co., Ltd., Tokyo, Japan

[21] Appl. No.: 201,100

[22] Filed: Feb. 23, 1994

Related U.S. Application Data

[63] Continuation of Ser. No. 956,658, Oct. 2, 1992, abandoned.

[30] Foreign Application Priority Data

Oct. 24, 1991 [JP] Japan ................... 3-277769

[51] Int. Cl.$^6$ ............... C08G 18/32; C08G 18/58; C08K 3/36; C08K 5/00
[52] U.S. Cl. ................. 523/435; 523/415; 523/465; 523/466; 523/467
[58] Field of Search ........... 523/415, 465, 466, 467, 523/435

[56] References Cited

U.S. PATENT DOCUMENTS

| | | | |
|---|---|---|---|
| 4,374,177 | 2/1983 | Hsu | 523/467 |
| 4,756,935 | 7/1988 | Takimoto | 523/465 |
| 4,987,163 | 1/1991 | Becker | 523/415 |
| 5,308,709 | 5/1994 | Ogino | 428/623 |

FOREIGN PATENT DOCUMENTS

| | | |
|---|---|---|
| 0307996 | 3/1989 | European Pat. Off. |
| 0437972 | 7/1991 | European Pat. Off. |
| 103185 | 6/1985 | Japan |
| 83172 | 9/1986 | Japan |

*Primary Examiner*—Frederick Krass
*Assistant Examiner*—D. R. Wilson
*Attorney, Agent, or Firm*—Ladas & Parry

[57] ABSTRACT

A lubricating paint including a resin mix, a lubricant additive and silica. The resin mix consists of a urethane resin with molecular weight of over 3,000 and an epoxy resin, with the solids of the urethane resin accounting for 50–97 wt % of the solids of the resin mix. The lubricant additive accounts for 2–40 wt % of all of the solids in the lubricating paint. The silica accounts for 5–100 wt % of all of the resin solids in the lubricating paint. The lubricating paint of the invention exhibits improved formability, corrosion resistance (rust resistance) and lubricity as compared with prior art paints. It also has improved weldability, stain resistance and chemical resistance.

9 Claims, No Drawings

LUBRICATING PAINT

This is a continuation of application Ser. No. 07/956,658, filed on Oct. 2, 1992, (now abandoned).

BACKGROUND OF THE INVENTION

This invention relates to a lubricating paint with excellent formability and corrosion resistance (antirust effect).

Cold-rolled steel plates, zinc-base plated steel and aluminum plates are commonly used by manufacturers of household electric appliances, automobiles, building materials, etc. In manufacture of these products, said plates are usually subjected to paint coating and assembling after forming work such as press forming. In the forming work, a lubricant, typically press oil, is applied to the plate to afford the desired press formability since the plate itself has no satisfactory formability. So, when coating and assembling are conducted after that, it is required to remove the applied lubricant in the cleaning stage, which is indispensable and burdensome.

Recently, steel plates not necessitating use of press oil in the step of press forming by use of stock plate having a wax type lubricant applied to its surface have been manufactured for the purposes of saving the process stages, reducing the cost and improving the working environment. These steel plates, however, involve the problem that the applied lubricant needs to be removed at the subsequent coating and assembling process. Also, the environment in which press forming is conducted on stock plate applied with a wax type lubricant is not quite satisfactory although improved over the one where press oil was used. Efforts have been made for overcoming these problems and a functional surface treated plate having more appropriate lubricating surface has been developed. The surface of this plate is coated with a thin film of a composition principally made up of an organic resin and having lubricating properties. This surface-treated plate, therefore, can be subjected to press forming with no need of applying a lubricant such as press oil, and further it does not necessitate cleaning and paint base treatments after press forming.

The prior techniques relating to such functional surface treated plates are disclosed in the following patent applications: (1) JPN Pat. Pub. No. (S)63-25032, (2) JPN Pat. Appln. Kokai No. (S)62-289274, (3) JPN Pat. Appln. Kokai Nos. (S)61-227178, (S)61-227179, (S)61-231177, (S)61-279687 and (S)62-33781, (4) JPN Pat. Appln. Kokai No. (S)60-103185, (5) JPN Pat. Appln. Kokai No. (S)63-83172, and (6) JPN Pat. Appln. Kokai No. (H)2-124997. A summary account of each of these prior techniques is given below.

(1) relates to an aqueous composition for forming lubricative coating film comprising principally an organic-inorganic composite reaction product composed of a water-soluble or water-dispersible organic resin, an alkoxysilane compound and silica, and a lubricant. The film of the organic-inorganic composite reaction product is poor in flexibility, so that although containing a lubricating component, the film is unable to follow up high-speed press forming and can not provide satisfactory lubricity. (2) discloses a coating film mainly composed of a composite or mixed material consisting of an urethane resin and silicon dioxide. The film of this type of composition is unable to attain high lubricity aimed at in the present invention. In (3), an inorganic solid lubricant of graphite or molybdenum disulfide or a mixture thereof with lubricating oil is specified as lubricant, but this lubricant provides a dynamic friction coefficient of friction of greater than 0.1 and is unsuited for high grade press forming work. (4) discloses a two-layer chromate treated steel plate. Flexibility of the base resin, an urethane-modified bisphenol A type epoxy resin, is greatly improved by urethane modification, but the coating is still unsatisfactory, and although containing a lubricating component, it is unable to follow up high-speed press forming and can not provide satisfactory lubricity. (5) discloses a composition obtained by incorporating a lubricating material in a resin composition comprising an organic resin selected from epoxy resins, polyester resins and acrylic resins and a curing agent. Formability attainable by use of this resin composition is low and insufficient for high-grade press forming work schemed in the present invention. The coating provided according to (6) is good in formability but inferior to the present invention in corrosion resistance. Corrosion resistance is improved by the double layer treatment comprising application of a resin for an undercoat, but the treating process is complicated, and it is impossible to attain the objective corrosion resistance and lubricity and is different from using a single surface treating agent as in the present invention.

As seen from the above review of the prior art, there is yet available no functional surface treated plate which can satisfy both requirements for high-level formability and corrosion resistance. Further, for the improvement of working environment for coating by use of a lubricating paint, there has been a strong demand for an aqueous alternative in place of a solvent-based treating agent. The present invention, which was attained as a result of strenuous research on compositions of lubricant paints for solving said prior art problems, provides a lubricating paint for functional surface treated plates having high-press formability, that is, having excellent lubricity as well as excellent corrosion resistance, weldability and chemical resistance.

SUMMARY OF THE INVENTION

The present inventors, as a result of strenuous efforts for obtaining a lubricating paint capable of satisfying requirements for both high-press formability and corrosion resistance, have succeeded in completing an invention relating to a lubricating paint with excellent formability and antirust effect, said paint comprising principally resins, a lubricant additive and silica ($SiO_2$), characterized by containing two types of resins, i.e., a high-molecular weight urethane resin having a molecular weight of 3,000 or above and an epoxy resin, in a specific ratio (solids of urethane resin being 50–97 wt % of solids of whole resin), a specified amount (2–40 wt % of whole solids of lubricating paint) of lubricating additive and a specified amount (5–100 wt % of whole solids of lubricating paint) of silica. The present invention is described in detail below.

The first feature of the present invention is to formulate appropriate types of resins as base resin.

The resin used in this invention needs to be of a composition having the balanced properties of adhesiveness, elongation, shear strength, corrosion resistance, wear resistance and chemical resistance. In order to meet this requirement, it is expedient to use the specific resins in appropriate combination. The present inventors had already succeeded in obtaining high-formability and corrosion resistance by blending a urethane resin and an epoxy resin along with a specific wax, and as a result of further studies, it was found that even more stabilized properties are provided by specifying the molecular weight of urethane resin to be greater than 3,000.

Uniformity of the coat is prerequisite for the attainment of high formability and high corrosion resistance. It is also an important factor to have a balance between strength and elongation. It was found that combination of high-molecular weight urethane resin and epoxy resin facilitates Control of basic physical properties owing to higher molecular weight base than a cross-linked coating film obtained with combination of low-molecular weight resins, and also makes it easier to obtain uniform physical properties when forming a thin film with a coating weight of 0.3–5 g/m$^2$. The above-mentioned "low-molecular weight urethane resins" are synonymous with the urethane resins containing various types of isocyanate crosslinking agents. Regarding specific resins, combination of a urethane resin with molecular weight of over 3,000 having excellent wear resistance and an epoxy resin having excellent adhesiveness or of use for improving film strength can provide a base resin suited for affording said specific properties—high formability and corrosion resistance—to the coat.

Preferably the urethane resin used in this invention is of the type having a polyether or polycarbonate skeleton, and the epoxy resin is the type having a molecular structure having a bisphenol A type skeleton or having a sulfide skeleton (S-S) in the main chain. Use of high-molecular weight urethane resin enables obtainment of a thin and uniform film and makes it possible to attain the object of this invention. Especially, use of said resin with elongation of higher than 50% and tensile strength of above 150 kg/cm$^2$ provides the highest formability. Combination of a urethane resin with a molecular weight of less than 3,000 and said type of epoxy resin can not provide high formability constantly. A crosslinked film made singly of a urethane resin with a molecular weight of greater than 3,000 is unsatisfactory in formability and corrosion resistance.

With the resin system comprising combination of said resins, further enhancement of molecular weight is effected by a crosslinking reaction between the isocyanate groups of urethane resin and the reactive functional groups (hydroxyl group, epoxy group, etc.) of epoxy resin in the course of film forming process. This crosslinking reaction can proceed with the combined resins alone, but if necessary, an isocyanate compound or an amino compound, which is available as curing agent, may be blended. For maintaining good chemical stability, it is especially preferred to use a resin system in which the isocyanate groups of urethane resin have been blocked so that the crosslinking reaction won't proceed at normal temperature but will proceed when heated.

As the material for blocking the isocyanate groups of urethane resin, there can be used the mono-functional blocking agents such as phenols, cresols, aromatic secondary amines, tertiary alcohols, lactams and oximes. As urethane resin having isocyanate groups, one may use monomers, dimers or trimers of aromatic diisocyanates such as tolylene diisocyanate, diphenylmethane diisocyanate and xylylene diisocyanate, reaction products thereof with polyether polyols, polyester polyols or the like, reaction products of monomers, dimers or trimers of alicyclic isocyanates which are hydrogenation derivatives of said substances, alicyclic diisocyanates such as isophorone diisocyanate, hexamethylene diisocyanate, etc., and aliphatic isocyanates with polyether polyols, polyester polyols or the like, and mixtures thereof. Examples of the polyether polyols usable here include the polyols obtained by adding ethylene oxide or propylene oxide to low-molecular weight glycols such as ethylene glycol, propylene glycol and bisphenol A, polyoxytetramethylene glycol and the like. Examples of the polyester polyols include the polyesters obtained from a dehydration-condensation reaction of low-molecular weight glycols and dibasic acids, and the lactam polyols obtained by subjecting lactams such as ε-caprolactam to ring-opening polymerization in the presence of a low-molecular weight glycol.

These urethane resins having the molecular configuration of a blocked isocyanate compound are self-crosslinked on heating. For further improving the coating film performance, specifically formability, chemical resistance and corrosion resistance, a method is known in which said resin having an isocyanate structure and an epoxy resin having reactive functional group (hydroxyl group, epoxy group, etc.) are blended and crosslinked by heating so as to improve the functional performance. It was found that this method can provide greater improvement of formability, corrosion resistance and chemical resistance than the method in which an isocyanate compound is used as curing agent or the crosslinked film forming method using an epoxy-modified urethane resin alone.

In the present invention, an epoxy resin having reactive functional groups (hydroxyl group, epoxy group, etc.) is blended in an amount of 3 to 50% by solid weight based on the total amount of resins. When its amount is less than 3%, the effect of its blending is scant, and when its amount exceeds 50%, the excellent formability improving effect of the urethane resin is reduced. Epoxy resins have a prominent chemical resistance and corrosion resistance improving effect. Of such epoxy resins, those with a structure having a bisphenol A type skeleton are effective for improving adhesiveness and corrosion resistance. A formability improving effect is also obtained since resin strength is enhanced. It is especially preferred to use an epoxy resin of a structure having a sulfide skeleton (S-S) in the main molecular chain as it was found that this epoxy resin can greatly improve chemical and corrosion resistance as well as formability. This owes to the rubber-like property creating effect by the sulfide skeleton.

As solvent for these resins, either an organic solvent or water may be used. When the resins are dissolved in an organic solvent, it is necessary to select a solvent having appropriate polarity, boiling point and evaporation rate. In case resins are dispersed or dissolved in water, there can be employed a method in which dispersion is effected by emulsification using a surface active agent or a method in which the resins are made water-soluble by adding polar group such as carboxyl group.

However, as it is impossible to obtain the desired formability with the film formed by these resins alone, it is necessary to use a lubricant additive or additives.

Examples of the lubricant additives usable in this invention include the known fluorine type, hydrocarbon type, fatty acid amide type, ester type, alcohol type, metal soap type and inorganic lubricants. As for the standard for selection of lubricant additive for improving formability, it is recommended to select a substance which, after formation of a film, will stay in the surface of the formed resin film rather than stay dispersed in the resin film, as this can attenuate the friction between the surface of the forming die and the metal formed to maximize the lubricating effect. When the lubricant stays dispersed in the formed resin film, the coefficient of surface friction is high and the resin film is prone to break. Also, in this case, the powdery substance tends to fall off and accumulate, causing a so-called "powdering" phenomenon which represents bad appearance and poor formability. As the lubricant substance which stays in the surface of the resin film, the one which is incompatible with the resins and small in surface energy is selected.

For further improving the formability attainable in the invention, it is recommended to add a fluorine-containing compound or a wax having a saponification value of 0 or less than 30. Use of such a compound or wax can greatly improve formability and is also helpful for providing the desired performance such as corrosion resistance and chemical resistance of the product. The compounds or waxes having a greater saponification value than 30 can hardly keep staying in the surface of the resin film since they are large in polarity and compatible with the resins, so that such compounds and waxes are unsuited for further elevating the forming performance level achieved by the present invention. Most preferred for use in this invention for said purpose are the waxes which are little compatible with the resins and have no ester linkage, with the saponification value thereof being 0. Typical examples of such waxes are the paraffin, microcrystalline and polyethylene non-oxidizing waxes. The particle size of these waxes in use for said purpose is not specified in this invention, but usually they are added with a particle size less than 20 $\mu$m and melted in the course of heating and film formation with the resins. Such a wax is allowed to stay in the surface portion of the resin film since it is incompatible with resins and small in surface energy, and it is solidified when cooled.

The waxes having a particle size greater than 20 $\mu$m are unfavorable for use for said purpose since distribution of the solidified wax becomes non-uniform. As for the method of addition of said wax, it is dispersed in a solvent such as toluene and then added to a solvent type resin, or a non-oxidizing wax is oxidized to a saponification value less than 30 to make the wax water-dispersible and then added to an aqueous resin. The amount of the lubricant additive added in this invention should be in the range of 2-40% based on the total solid weight of the lubricating paint. When the amount of said additive is less than 2%, its effect of improving formability is too small, and when the amount of the additive exceeds 40%, formability is lowered due to a reduction of elongation and strength of the resin film, and also corrosion resistance is deteriorated due to lowering of the binder effect of the resin film.

The fluorine-containing compounds tend to stay in the surface portion of the resin film since they are incompatible with the resins and also small in surface energy, and they are capable of providing excellent lubricity. However, since the lubricating performance presented by these compounds under the high-speed and high surface pressure is lower than that offered by the waxes, it is necessary to use about double as much amount of compound as wax for attaining the same formability as provided by wax. As for the kind of the fluorine-containing compounds usable for said purpose in this invention, there can be used various types of high-molecular weight fluorine-containing compounds which include the polymers prepared by substituting H in the recurring unit $-(CH_2-CH_2)-$ of polyethylene (PE) with fluorine atom, such as polyvinyl fluoride (PVF), polyvinylidene fluoride (PVdF), polytrifluoroethylene (PTrFE) and polytetrafluoroethylene (PTFE), copolymers thereof with various types of olefins, and the modified products thereof. Of these compounds, PTFE is especially preferred for its low coefficient of friction. The fluorine-containing compounds are superior to waxes in heat resistance and lubricating performance under light loading, so that joint use of said type of wax and said type of fluorine-containing compound finds a wider scope of use of the composition for lubrication and anti-frictional purposes. As for the way of addition of a fluorine-containing compound, it is expedient to have the compound dispersed in the form of fine powder in the lubricating paint composition, instead of simply adding said compound as a resin polymer. In case of adding said compound to an aqueous paint, it is necessary to treat the compound for making its particle surfaces hydrophilic with a surface active agent and by chemical etching or other means, before dispersing the compound in the paint, since the fluorine-containing compounds have strong water repellency.

As other additives, $SiO_2$ is preferably added, in an amount of 5-100% based on the total solid of resin, for improving corrosion resistance. Addition of $SiO_2$ has the effects of greatly improving corrosion resistance and bettering formability. When the amount of $SiO_2$ added is less than 5%, its effect of improving corrosion resistance and formability is unsatisfactory, and when its amount exceeds 100%, there results a reduction of resin binder effect and corrosion resistance and lowering of elongation and strength of resin, hence deterioration of formability. The particle size of $SiO_2$ is not specified in this invention, but it is preferably in the range of 3-30 m$\mu$. When its particle size exceeds 30 m$\mu$ or is less than 3 m$\mu$, there may not be obtained high-degree formability and corrosion resistance. A conductive material and a color pigment may be added for improving weldability and for improving design flexibility respectively. Other additives such as anti-settling agent, leveling agent, thickener, etc., can also be added.

The materials on which the above-described lubricating paint can be applied include cold-rolled steel plate, zinc-base plated steel plate and aluminum plate. It is expedient to apply a surface treatment for providing greater improvement of corrosion resistance. Known chromate treatment or zinc phosphate treatment is appropriate as such surface treatment. The lubricating paint is applied on the film formed by said surface treatment on the material to be coated. It is usually preferable to form a coat of 0.3-5 g/m$^2$ in view of the provided performance characteristics such as formability, corrosion resistance and weldability.

DESCRIPTION OF THE PREFERRED EMBODIMENT

In the following, the present invention will be described more particularly with reference to the examples thereof.

1. Preparation of test pieces (1-1) Material offered to test

Commercially available 0.8 mm thick zinc-electroplated steel plate (EG; plating rate: 20/20 g/m$^2$) or commercially available 1.0 mm thick aluminum plate (JIS 5052) was offered to test.

(1-2) Cleaning

The test material was subjected to cleaning with a silicate type alkaline cleaner Fine Cleaner TM 4336 (produced by Nihon parkerizing Co., Ltd.).

(1-3-1) Chromate treatment

Chromate film was formed by spraying Zinchrom ® 3367 (Nihon parkerizing Co., Ltd.) on the material surface, rinsing with water and drying at ambient temperature of 220° C. (peak metal temperature: 100° C.) for 10 seconds. Chromium amount in the coating: 50 mg/m².

(1-3-2) Zinc phosphate treatment

Zinc phosphate film was formed by dipping the material in Palbond TM L3020 (Nihon parkerizing Co., Ltd.), rinsing with water and air drying. Zinc phosphate coating weight: 2.3 g/m².

(1-4) Application of lubricating paint

The lubricating paints shown in Table 1 were applied on said plate by a bar coater and dried at ambient temperature of 260° C. (peak metal temperature: 160° C.) for 30 seconds.

2. Performance tests (2-1) Formability

High-speed cupping test was conducted under the following conditions: blank diameter=96 mm for electroplated steel plate and 84 mm for aluminum plate; punch diameter=40 mm; blank holder pressure=1.0 ton; deep drawing rate=30 m/min. Limit Drawing ratio (LDR) was 2.40 for zinc electroplated steel plate and 2.10 for aluminum plate.

Criterion of evaluation

⊚: Could be drawn out even at limit drawing ratio (LDR) of 2.50 (for electroplated steel plate) or 2.20 (for aluminum plate).

○: Could be drawn out.

×: Could not be drawn out.

(2-2) Corrosion resistance

Salt spray test according to JIS-Z-2731 was conducted on the electroplated steel plate for 400 hours and on the aluminum plate for 1,000 hours, and the state of white rusting on the plate was observed.

Criterion of evaluation

○: Rust formed at less than 5% of the whole surface area.

△: Rust formed at 5-20% of the whole surface area.

×: Rust formed at more than 20% of the whole surface area.

(2-3) Chemical resistance

Solvent resistance or alkali resistance test was conducted, and the above-described evaluation of corrosion resistance was made. In the solvent resistance test, the test material was dipped in trichloroethylene vapor for 3 minutes. In the alkali resistance test, the test material was dipped in a silicate type alkaline cleaner (20 g/l) at 60° C. for 5 minutes.

Criterion of evaluation

○: Rusting took place at less than 5% of the whole surface area, causing no deterioration of performance.

×: Rusting took place at more than 5% of the whole surface area, causing deterioration of performance.

3. Test results

Table 1, which shows a list of the lubricating paint compositions, and Table 2, which shows the performance test results, give the comparative summaries of the Examples of this invention and the Comparative Examples.

In Table 2, Nos. 1 to 8 are the examples in which a chromate or phosphate film was formed on a zinc-base plated steel plate or an aluminum plate and then the lubricating paints prepared according to this invention were applied thereon and dried to form a coat. Each of the coats thus formed showed excellent performance relating to formability, corrosion resistance and chemical resistance.

Nos. 9 to 18 in Table 2 are the examples in which the lubricating paints different from those of the present invention were used. The coats formed by using these paints showed mostly unsatisfactory or poor performance.

TABLE 1

List of lubricating paints

Composition (Figures at the bottom of each horizontal section (A–N) are wt % of solids. Unit of particle size of silica: mμ)

| | Kind of resin | | | Lubricant additive | Other additive |
|---|---|---|---|---|---|
| | Urethane | Epoxy | Others | | |
| EXAMPLES | | | | | |
| A | Polyether Mw: 8,000 50% | Bisphenol A 10% | None | Wax S.V.: 10 10% | Silica P.S.: 10 30% |
| B | Polyether Mw: 20,000 50% | Polysulfide 20% | None | Wax S.V.: 10 10% | Silica P.S.: 10 20% |
| C | Polyether Mw: 50,000 50% | Bisphenol A 10% | None | Fluorine compound 15% | Silica P.S.: 10 25% |
| D | Polycarbonate Mw: 20,000 50% | Polysulfide 10% | None | Wax S.V.: 10 10% | Silica P.S.: 10 30% |
| E | Polyether Mw: 20,000 50% | Bisphenol A 10% | None | Wax + fluorine compound 5% + 5% | Silica P.S.: 10 25% |
| COMPARATIVE EXAMPLES | | | | | |
| F | Polyether Mw: 20,000 60% | None | None | Wax S.V.: 10 10% | Silica P.S.: 10 30% |
| G | Polyether Mw: 20,000 60% | Bisphenol A 10% | None | Wax S.V.: 10 1% | Silica P.S.: 10 29% |
| H | Polyether Mw: 20,000 | Bisphenol A | None | Wax S.V.: 10 | Silica P.S.: 10 |

TABLE 1-continued

List of lubricating paints
Composition (Figures at the bottom of each horizontal section
(A–N) are wt % of solids. Unit of particle size of silica: m$\mu$)

| | Kind of resin | | | Lubricant additive | Other additive |
|---|---|---|---|---|---|
| | Urethane | Epoxy | Others | | |
| I | 68%<br>Polyether<br>Mw: 2,000 | 10%<br>Bisphenol A | None | 10%<br>Wax<br>S.V.: 10 | 2%<br>Silica<br>P.S.: 10 |
| J | 50%<br>Polyether<br>Mw: 20,000 | 10%<br>Bisphenol A | None | 10%<br>Wax<br>S.V.: 10 | 30%<br>Silica<br>P.S.: 10 |
| K | 20%<br>Polyether<br>Mw: 20,000 | 40%<br>Bisphenol A | None | 10%<br>Wax<br>S.V.: 10 | 30%<br>Silica<br>P.S.: 10 |
| L | 30%<br>Polyether<br>Mw: 20,000 | 5%<br>Bisphenol A | None | 50%<br>Wax<br>S.V.: 10 | 15%<br>Silica<br>P.S.: 10 |
| M | 30%<br>None | 10%<br>Bisphenol A<br>10% | Acryl<br>60% | 10%<br>Wax<br>S.V.: 10 | 50%<br>Silica<br>P.S.: 10 |
| N | None | None | Polyester<br>60% | Wax<br>S.V.: 10<br>10% | Silica<br>P.S.: 10<br>30% |

(Note)
Mw: molecular weight; S.V.: saponification value; P.S.: particle size.

TABLE 2

| | Substrate Kind | Surface treatment Coating weight (g/m$^2$) | Surface treatment Kind | Lubricating paint Kind | Lubricating paint Coating weight (g/m$^2$) | Performance Formability | Performance Corrosion resistance | Performance Chemical resistance |
|---|---|---|---|---|---|---|---|---|
| EXAMPLES | | | | | | | | |
| 1 | EG | 0.05 | Chromate | A | 1.0 | ○ | ○ | ○ |
| 2 | ↑ | ↑ | ↑ | B | ↑ | ○ | ○ | ○ |
| 3 | ↑ | ↑ | ↑ | C | ↑ | ○ | ○ | ○ |
| 4 | ↑ | ↑ | ↑ | D | ↑ | ○ | ○ | ○ |
| 5 | ↑ | ↑ | ↑ | E | ↑ | ○ | ○ | ○ |
| 6 | ↑ | 2.30 | Phosphate | A | ↑ | ○ | ○ | ○ |
| 7 | Aluminum | 0.05 | Chromate | A | ↑ | ○ | ○ | ○ |
| 8 | ↑ | 2.30 | Phosphate | A | ↑ | ○ | ○ | ○ |
| COMPARATIVE EXAMPLES | | | | | | | | |
| 9 | EG | 0.05 | Chromate | F | ↑ | X | Δ | Δ |
| 10 | ↑ | ↑ | ↑ | G | ↑ | X | ○ | ○ |
| 11 | ↑ | ↑ | ↑ | H | ↑ | ○ | X | X |
| 12 | ↑ | ↑ | ↑ | I | ↑ | ○ | Δ | Δ |
| 13 | ↑ | ↑ | ↑ | J | ↑ | X | ○ | ○ |
| 14 | ↑ | ↑ | ↑ | K | ↑ | ○ | Δ | Δ |
| 15 | ↑ | ↑ | ↑ | L | ↑ | X | Δ | Δ |
| 16 | ↑ | ↑ | ↑ | M | ↑ | X | ○ | ○ |
| 17 | ↑ | ↑ | ↑ | N | ↑ | ○ | Δ | Δ |
| 18 | Aluminum | ↑ | ↑ | F | ↑ | X | Δ | Δ |

As described above, the lubricating paints obtained according to the present invention comprise essentially a resin mix, a lubricant additive and SiO$_2$. The present inventors had already disclosed that high-degree formability and corrosion resistance could be obtained by mixing an urethane resin and an epoxy resin and blending therewith a specific wax, and as a result of further studies, it was now found that uniformity of the coating is improved and the coat exhibits higher performance, which is stabilized, when the molecular weight of the urethane resin is specified to be greater than 3,000. The present invention embodies this finding.

The coating film formed by the lubricating paint according to this invention has high-degree formability, that is, excellent lubricating properties as well as excellent corrosion resistance, weldability, stain resistance and chemical resistance, owing to combination of the wear-resistant properties of high-molecular weight urethane resin, the effect of improving corrosion resistance, chemical resistance and formability by joint use of epoxy resin, the lubricating effect of wax or fluorine type lubricant incompatible with said resins, and the prominent corrosion resistance and formability improving effect of SiO$_2$. Thus, the present invention is capable of attaining the objects of saving process stages, reducing the cost and improving the working environment.

What is claimed is:

1. A lubricating paint consisting essentially of:
   1) a resin mix consisting of
      a) a urethane resin comprising a plurality of isocyanate groups, said urethane resin being formed by polymerizing monomers, dimers or trimers containing said isocyanate groups with polyether polyols or polyester polyols;

b) an epoxy resin having a bisphenol A skeleton; said urethane resin having a molecular weight sufficient to enable the paint to be formed into a thin and uniform film, said urethane resin containing solids which comprise about 50-97 wt % of the total resin solids, said urethane resin being crosslinkable with said epoxy resin;

2) a lubricant additive consisting of
  i) a wax having a saponification value of 0 or more but less than 30, or
  ii) a fluorine-containing polymer suitable for improving formability in paint, or
  iii) both; said lubricant additive containing solids which comprise about 2-40 wt % of the total paint solids and 3) silica, said silica being present in an amount sufficient to improve the corrosion resistance and formability of the paint but not exceeding about 50 wt % based on the total resin solids.

2. A lubricating paint as claimed in claim 1, wherein the urethane and epoxy resins are not crosslinked, but are crosslinkable with the application of heat.

3. A lubricating paint as claimed in claim 2, wherein the fluorine-containing polymer comprises polyvinyl fluoride, polyvinylidene fluoride, polytrifluoroethylene, or polytetrafluoroethylene.

4. A lubricating paint as claimed in claim 2, wherein the fluorine-containing polymer is prepared by substituting a fluorine atom or atoms for hydrogen in a recurring monomeric unit $-(CH_2-CH_2)-$ of polyethylene.

5. A lubricating paint as claimed in claim 4, wherein the fluorine-containing polymer is a copolymer.

6. A lubricating paint as claimed in claim 4, wherein the isocyanate groups of the urethane resin have been blocked whereby to permit crosslinking between said epoxy resin and said urethane resin only upon the application of heat.

7. A lubricating paint as claimed in claim 1 wherein the urethane resin comprises about 50% of the total paint solids.

8. A lubricating paint as claimed in claim 1 wherein the paint has been coated on a surface and the urethane resin and the epoxy resin have been crosslinked by heating.

9. A lubricating paint as claimed in claim 1, wherein the urethane resin has an elongation of higher than 50% and a tensile strength of about 150 kg/cm$^2$.

* * * * *